United States Patent

[11] 3,615,661

[72] Inventors Rudolph H. Ellinger
 New Canaan, Conn.;
 Mark G. Schwartz, Yonkers, N.Y.
[21] Appl. No. 744,680
[22] Filed July 15, 1968
[45] Patented Oct. 26, 1971
[73] Assignee Stauffer Chemical Company
 New York, N.Y.

[54] REPLACEMENT OF SODIUM CASEINATE
 15 Claims, No Drawings
[52] U.S. Cl. .................................................... 99/54,
 99/57, 99/63, 99/65, 99/115, 99/136, 99/139
[51] Int. Cl. ............................................. A23c 13/12,
 A23c 19/12
[50] Field of Search ............................. 99/54, 57,
 63, 94, 139, 65, 136

[56] References Cited
 UNITED STATES PATENTS
2,923,628 2/1960 Otto ............................. 99/63
3,201,245 8/1965 Clark et al. ................... 99/57
3,269,843 8/1966 McKee et al. ................. 99/94

OTHER REFERENCES

Webb et al., The Utilization of Whey: A Review, J. Da. Sci., Vol. 31, No. 2, Feb., 1948 (pages 154– 157) SF 22/J8.

Primary Examiner—Lionel M. Shapiro
Assistant Examiner—D. M. Naff
Attorneys—Paul J. Juettner, Wayne C. Jaeschke and Martin Goldwasser ABSTRACT: Compositions of dry whey solids and lactalbum phosphate are provided which exhibit functional properties in food compositions as well as nutrient value. The lactalbumin phosphate is present in an amount of at least one percent based on the percent of whey solids. These compositions are preferably used as replacement, total or partial for sodium caseinate in nonbutterfat dairy products.

REPLACEMENT OF SODIUM CASEINATE

This invention relates to compositions of dry whey solids and lactalbumin phosphate. More particularly, this invention relates to dry mixtures of whey solids and lactalbumin phosphate which impart desirable functional properties to whey thereby permitting its use in food applications where it was heretofore unsuitable.

The compositions of this invention are useful in various food compositions particularly those containing fat. Areas of particular utility include both liquid and powdered coffee whiteners, whipped toppings and the like.

As a byproduct of cheese production, whey has long been discarded as waste. In recent times worldwide shortages of protein have directed a considerable effort to the recovery of whey protein as a food source. While a relatively small proportion of whey is utilized in animal feed, and a proportion is dried and utilized for human consumption, a large proportion of whey is still discarded as waste. This has resulted not only in a loss of recoverable protein as a food source but has also contributed to the pollution of many streams, lakes and rivers.

The very composition of whey has historically mitigated against its use as a food source. Whey contains only from about 5 to about 10 percent solids, the remainder being water. Thus, to even produce dry whey solids, a disproportionately large amount of water must be removed. Large scale drying techniques have in recent years been developed, however, which make the production of dry whey solids both technically possible and economically feasible. A very large proportion of the dried whey produced, however, still is utilized as animal feed. Utilization of dried whey in food compositions for human consumption has not proved feasible because of the functional deficiencies inherent in the dry whey solids themselves.

One particular food area where the use of whey has proven functionally deficient is in nonbutterfat containing dairy product compositions such as the coffee whiteners, whipped toppings, and the like. While such products could theoretically utilize dry whey solids, they have been found functionally deficient. Dry whey used in nonbutterfat coffee whitener compositions for example, results in products which exhibit oil separation, and feathering in hot coffee. While this is nutritionally unimportant, it is aesthetically unacceptable. Liquid coffee whiteners utilizing dried whey exhibit not only the foregoing deficiencies but additionally are subject to phase separation which again is also unacceptable from a market standpoint.

Accordingly, it is believed that the present invention which overcomes the inherent problems in the use of dry whey solids in food applications represents a considerable advance in the art which could effect the utilization of unused protein and consequentially reduce somewhat the pollution of the streams and rivers into which the greater portion of liquid whey is conveniently discharged as waste.

In accordance with the present invention, dry whey solids have been found to be functionally suitable for use in nonbutterfat dairy products by simple admixture with particulate lactalbumin phosphate.

The lactalbumin phosphate utilized in this invention may be succinctly defined as the product produced by "reacting" long chain polyphosphates with liquid whey and drying the resulting precipitate without denaturation of the protein. Suitable long chain polyphosphates are the glassy sodium and potassium metaphosphates having a $P_2O_5$ content of 66 percent or greater. These straight chain inorganic polymers, which are sometimes known as hexametaphosphates, are to be distinguished from the cyclic or ring metaphosphates. Where potassium metaphosphate is used, it is preferable to first react the metaphosphate in solution with a sodium salt such as sodium sulfate, sodium chloride, sodium pyrophosphate, sodium hexametaphosphate (short chain) etc., to improve solubility. Mixtures of sodium and potassium glassy metaphosphates are also suitable for precipitating lactalbumin phosphate. The preparation of undenatured protein metaphosphates by reaction between an alkali metaphosphate and soluble protein is described in an article by Briggs, David R., The Journal of Biological Chemistry, Vol. 134, June 1940, pp. 261–272. After treatment of the whey protein with a glassy metaphosphate by the preferred process of the present invention, the whey is centrifuged to collect a heavy gumlike coagulum of lactalbumin phosphate which is then dried. To prevent denaturation of the protein, the whey temperature is normally maintained below 180° F., preferably below about 160° F. For the same reason, it is preferable to dry the coagulum by spray-drying at low temperatures, although other types of driers, such as drum driers, rotary driers, etc., are also suitable. Recovery of the soluble proteins from the whey is essentially quantitative, with only minor processing losses. The following specific illustration will further illustrate the preparation of undenatured lactalbumin phosphate.

ILLUSTRATION

To 1400 pounds of bovine whey at 140–180° F. is added 80 pounds of a 10 percent solution of eight parts sodium metaphosphate and one part potassium metaphosphate. The treated whey is then passed into a De Laval-type centrifuge where a heavy, gumlike coagulum is recovered. The coagulum is then spray-dried and recovered as a white particulate product.

In general, the characteristics and properties of the lactalbumin phosphate produced according to the aforesaid procedure will be somewhat dependent upon processing conditions, (temperature, etc.) the pH of the whey, and the chain length of the glassy metaphosphate starting material. As normally produced, the product contains between 40 percent and 70 percent protein and between about 15 percent and 25 percent phosphate. A preferred lactalbumin phosphate for food applications contains between about 50 and 65 percent protein. Also, the lactalbumin phosphate will range in pH from about 5 to 7, while a preferred product has a pH of about 6.0. We will now more specifically illustrate the application of undenatured lactalbumin phosphates in various food products.

Whole liquid whey is the liquid normally obtained from the manufacture of cheese. This liquid is residual from the milk after the formation and removal of the curds. The whole liquid whey contains soluble protein, principally lactoglobulin and lactalbumin, soluble salts or minerals of the milk, fat, lactose and a large amount of water. While the composition of whole liquid whey will vary somewhat in respect to the particular cheese making process from which it is derived, the following approximate composition of whole liquid whey is illustrative and generally representative.

| Constituent | Approximate Percent by Weight |
| --- | --- |
| Water | 93.2 |
| Protein | 0.9 |
| Lactose | 5.1 |
| Fat | 0.3 |
| Minerals | 0.5 |

Whole liquid whey generally contains approximately 7 percent by weight solids. The whole whey solids are obtained by removing water from the whole liquid whey. This drying operation can be effected by several processes. For example, the whole liquid whey can be dried directly by conventional techniques to provide whole dry whey solids or prior to drying some or all of the nonprotein components can be removed.

It is an important feature of this invention that dry whey can be used containing all the solid components of the liquid whole whey to 100 percent dry whey protein. Accordingly, it is intended that for purposes of this invention dry whey solids include dry whey containing up to 100 percent whey protein. Whole dry whey generally contains at least 5 percent by weight and usually about 12 percent by weight whey protein but this amount can vary depending on such factors as the milk source, the cheese process, and the like.

While any whole dry whey can be utilized in this invention, it is preferred to employ dry demineralized whey. The demineralized whey has had all or a portion of the naturally occurring mineral content removed. It is preferred, though not necessary, that whey employed herein have a mineral content of from about 1 to about 5 percent by weight based upon the weight of the dry whey. It is most preferred to employ demineralized whey having a mineral content of from about 2 to about 4 percent.

Liquid whey is demineralized utilizing conventional dialysis or electrodialysis techniques well known to the art. After the mineral content of the whey has been reduced, it is dried by conventional drying techniques such as spray drying to form demineralized dry whey.

Similarly, the dry whey employed in the compositions of this invention can have a reduced lactose content, if desired. A portion of the lactose occurring in whole liquid whey is routinely removed in some commercial operations by crystallization incident to the particular process being employed.

The amount of lactalbumin phosphate utilized in the whey composition of this invention will vary slightly depending upon the particular dry whey solids employed and the particular recipe in which they are to be used. In general, however, amounts of at least 1.0 percent based on the percent whey protein are satisfactory although it is preferred that amounts of from about 10 to about 40 percent be used and most preferred that amounts from about 25.0 to about 35 percent be used. Slight adjustment well within the skill of the art may be desirable to achieve optimum performance in any given formulation.

Ratios of 5:1 protein to phosphate by weight to ratios of 3:1 are preferred in the compositions of this invention based on economic consideration and optimum effectiveness, although higher and lower ratios can be employed. These ratios apply to the total protein in the whey and lactalbumin phosphate. The phosphate value of course is derived from the lactalbumin phosphate.

The whey-lactalbumin phosphate compositions of this invention are formed by the simple admixture of the component ingredients. It is, of course, desired that these mixtures be thoroughly blended to provide a uniform mixture. Any conventional blender or mixers suitable for blending dry powders can be used provided, of course, they meet the general requirements of food processing.

In respect to particle size of the whey-lactalbumin phosphate mixture, there are no critical requirements, although it is desirable that the lactalbumin phosphate and whey particles be of relatively similar size to avoid gravity separation in transit. A whey-lactalbumin phosphate mixture having particle sizes of from about 80 mesh to about 125 mesh has been found to be quite suitable, although larger and smaller particle sizes can be employed if desired.

The mixtures of this invention, as indicated above, are useful in nonbutterfat dairy products and it has been found that they are particularly useful in those areas wherein sodium caseinate has been heretofore used. The mixtures of this invention serve effectively as a replacement for sodium caseinate on equal protein basis in the whole or in part.

Sodium caseinate formed by the alkali neutralization of casein has found broad utility in nonbutterfat dairy products. Sodium caseinate is conventionally used in such food compositions as coffee whiteners, whipped toppings, mellorines, frozen desserts, puddings, custards, frozen cream pies, process cheese, imitation sour creams, snack dips, baby foods, instant breakfasts, and the like. While sodium caseinate generally serves a specific function in these compositions, it simultaneously serves as a nutrient additive. The mixtures of this invention can effectively replace sodium caseinate in all such food compositions although they are particularly effective in coffee whitener compositions and whipped toppings. The importance of this discovery is enhanced by the fact that the availability of whole milk and whole milk products such as casein is dwindling with increase in population, and that dry whey as recovered from waste whey has in instances in the past been unsuitable for use in such food compositions. The unsuitability of dried whey in such compositions was believed due to the partial denaturation of the protein and the large amounts of lactose present adversely affecting the functional properties of the material. The amount of the compositions of this invention used in any of the nonbutterfat dairy product compositions will vary with the amount of sodium caseinate normally used in such compositions and whether or not the sodium caseinate is partially or wholly replaced by the compositions of this invention. In any given composition, however, the compositions of this invention replace sodium caseinate on an equal protein basis based on the amount of protein available in the whey polyphosphate compositions. Sodium caseinate is normally used in food compositions in an amount of from 0.5 to about 20 percent although higher amounts can be used if desired.

The mixtures of this composition can also be used with sodium caseinate in these food compositions in a ratio of from about 0.1 to about 100 parts by weight of the mixture of this invention to from about 99.9 to about 0 parts of sodium caseinate.

Sodium caseinate serves one or more functions in various food compositions containing it. For example, in compositions containing fat or oil and water, this ingredient serves to encapsulate the oil droplets and bind water, thus stabilizing the composition and preventing separation of oil and water from the food composition. In compositions where air is blended or beaten into the mixture, sodium caseinate serves to further bind the air bubbles to the encapsulated oil or fat and water, and thus stabilize the foam, i.e., the air, water, fat system. It similarly serves to prevent or inhibit churning in certain applications.

It has been further found that in addition to replacing sodium caseinate in such food compositions per function, compositions of this invention provide to the food composition similar nutritive values based upon essential amino acid composition. This can be seen from table I following where the approximate respective constituents of amino acid for dried whey, casein, lactalbumin, lactoglobulin, and lactalbumin phosphate are set forth. While the compositions of this invention are well suited to the nonbutterfat dairy product compositions, they can be effectively employed in any food composition, as for example in process cheese composition.

The lactalbumin phosphate-whey compositions of this invention are generally employed in food compositions in an amount of from about 0.05 to about 15 percent by weight, although as indicated above, the specific amounts will vary somewhat from recipe to recipe and formulation to formulation. It is desirable to provide a protein value of the final food product of at least 0.3 percent by weight and most preferably of at least 0.8 percent by weight. This is particularly true when the food composition is emulsified as in the case of coffee whitener compositions.

TABLE I.—ESSENTIAL AMINO ACID CONTENT OF PROTEINS

[Grams/100 grams of protein]

| | Arginine | Histidine | Isoleucine | Leucine | Lysine | Methionine | Phenylalanine | Threonine | Valine | Tryptophan | Tryosine |
|---|---|---|---|---|---|---|---|---|---|---|---|
| Casein | 4.10 | 3.02 | 6.6 | 10.55 | 8.60 | 3.17 | 5.72 | 4.46 | 8.24 | 1.17 | 5.64 |
| Milk, lactalbumin | 4.00 | 2.30 | 7.50 | 12.10 | 10.50 | 2.60 | 5.00 | 6.00 | 6.60 | 2.50 | 5.30 |
| Milk, lactoglobulin | 2.90 | 1.60 | 6.80 | 15.50 | 11.30 | 3.20 | 3.70 | 5.30 | 5.88 | 1.90 | 3.70 |
| Milk, dried whey | 2.06 | 1.18 | 5.54 | 9.10 | 7.48 | 1.00 | 2.43 | 4.86 | 4.49 | 1.06 | 1.99 |
| Lactalbumin phosphate | 2.16 | 1.26 | 4.38 | 7.92 | 6.42 | 1.68 | 3.48 | 3.48 | 3.78 | 1.38 | 2.88 |

As indicated above, the compositions of this invention are directed primarily to utilization in nonbutterfat dairy products. Certain of these nonbutterfat dairy products are described in detail hereinafter. For convenience, sodium caseinate has been used as an illustrative component. It is understood, however, that the compositions of this invention serve as total or partial replacement for this ingredient and substitution serves as example.

COFFEE WHITENERS

Coffee whiteners have been on the market for several years and have proven to be an effective substitute for whole milk and cream in coffee. Two types of coffee whiteners have been marketed: the dry and liquid form. These products have the advantage that they are less expensive than the corresponding natural dairy product. The dry form is particularly advantageous in that it requires no refrigeration, and reduces risk of spoilage. For these reasons, coffee whiteners have received a popular reception in such market areas as offices, and picnic and company supplies where refrigeration is not available or where risk of spillage is a problem. Sodium caseinate is commonly used in coffee whiteners to encapsulate the fat or oil droplets, thus preventing separation of the fat and coalescence of the droplets to form fat lakes on the surface of hot coffee. As is well known, cream often separates on the surface of hot coffee forming globules of butterfat. Thus, when properly formulated and manufactured, coffee whiteners are often superior in stability to cream.

Sodium caseinate is generally used in dry coffee whiteners in amounts of from about 5 to about 10 percent based on the total composition.

Set forth below are typical coffee whitener formulations with a range of ingredients given for each. One of these formulations is for a liquid type coffee whitener, the other for a dry type.

In the example below, the control formulation is a typical formula for coffee whiteners containing sodium caseinate. LAP is employed as the designation for lactalbumin phosphate.

Coffee Whiteners, Liquid

| Ingredients | % (Range) |
| --- | --- |
| Sodium caseinate or | 0.5–5.0 |
| LAP-whey mixture | 1.5–15.0 |
| (1.3/3.0 LAP-whey) | |
| Corn syrup solids | 7.5–15.0 |
| (Adjusted for LAP-whey mixture) | 4.0–10.0 |
| Vegetable shortening | 7.5–15.0 |
| Dipotassium phosphate | 0.5–1.5 |
| Stabilizer and emulsifiers | 0–5.0 |
| Flavoring | As needed |
| Water | To bring to 100% |

Coffee Whiteners, Dry

| Ingredients | % Range |
| --- | --- |
| Sodium caseinate or | 5.0–10.0 |
| LAP-whey mixture | 15.0–30.0 |
| (1.3/3.0 LAP/whey) | |
| Vegetable shortening | 35.0–50.0 |
| Corn syrup solids | 35.0–50.0 |
| (Adjusted for CAP-whey mixture) | 25.0–40.0 |
| Emulsifiers and stabilizers | 0–5.0 |
| Dipotassium phosphate | 0.5–3.0 |
| Flavoring | As needed |

In the foregoing formulations LAP-whey mixtures can be used to replace the sodium caseinate in whole or in part.

Two typical type formulations for coffee whiteners utilizing dry LAP-whey mixtures are set forth below:

Dry Whey-Lactalbumin Replacement of Sodium Caseinate

Coffee Whitener (liquid)

| Ingredient | Percent |
| --- | --- |
| LAP-whey mixture | 4.30 |
| (1.3/3.0 LAP/whey) | |
| Corn syrup solids | 8.70 |
| Dipotassium phosphate | 1.07 |
| Vegetable shortening | 10.00 |
| Stabilizer and emulsifier | 0.40 |
| Water | Balance |

Coffee Whitener (dry)

| Ingredient | Percent |
| --- | --- |
| LAP-whey mixture | 17.20 |
| (1.3/3.0 LAP-whey) | |
| Hydrogenated vegetable shortening | 44.20 |
| Corn syrup solids | 35.95 |
| Mono and diglycerides | 0.50 |
| Carageenin | 0.35 |
| Dipotassium phosphate | 1.00 |
| Flavoring | 0.20 |

In the examples which follow and throughout this specification all parts and percentages given are by weight unless otherwise specified. Additionally the following terms have the following meaning throughout:

Corn syrup solids - 24 DE - Powdered maltodextrin produced by spray drying low concentration corn syrup. The numeral letter designation refers to a 24 Dextrose equivalent.

Carageenin is a gum extracted from red seaweed (Irish Moss).

Emulsifier - In each instance the emulsifier used was a mixture of mono- and diglycerides of the fat acids containing approximately 40 percent monoglyceride.

Vegetable shortening - Hydrogenated vegetable oil.

It will be noted that in the various nonbutterfat dairy products set forth herein when the whey-polyphosphate mixture of this invention is used the sugar or corn syrup solids must be adjusted. This adjustment is by reduction in amount necessary and provides a savings.

A dry mixture of the lactalbumin phosphate and whey is utilized in a ratio of approximately 3:1 protein to phosphate by weight. This dry blend is used to prepare liquid coffee whiteners having the following formulation:

| Ingredient | Amount |
| --- | --- |
| Whey-LAP blend | 4.30 |
| (1.3/3.0 LAP-whey) | |
| Corn syrup solids | 8.70 |
| Vegetable shortening | 10.00 |
| Dipotassium phosphate | 1.00 |
| Stabilizers and emulsifiers | 0.25 |
| Flavoring | As needed |
| Water | As needed to bring to 100% |

Both the control and the test formulations are prepared as follows:

1. The sodium caseinate or whey/lactalbumin phosphate ingredient was blended with the corn syrup solids, and carageenin.
2. The dipotassium phosphate buffer is dissolved in the water.
3. The blended dry ingredients are slowly added with mixing sufficient to thoroughly disperse them in the water.
4. The shortening is added.
5. The mixture is heated with constant rapid stirring in a steam jacketed kettle to 160° F.
6. The emulsifier is added and permitted to melt.
7. The solution is then homogenized at a temperature of 160° F. in a two stage homogenizer at 2500/500 p.s.i.
8. The homogenized mixture is cooled to a temperature of 35° to 40° F. and thereafter permitted to "age" overnight at refrigerator temperatures before evaluation (approximately 40° C.).

9. When dry compositions are desired, the liquid composition is dried by such means as spray drying.

EVALUATION

Control with sodium caseinate is normal in all characteristics. No separation of the emulsion occurred during overnight aging. The viscosity, as measured on a Brookfield model HAF viscometer spindle No. 1 at 10 r.p.m. is about 70 c.p.s. No fat droplets appeared when added to coffee at 180° F.

In respect to the test formulations, these are considered successful if they do not exhibit separation after overnight aging, they did not "feather" on addition to hot coffee and if no fat droplets appeared on the surface of the hot coffee. If any of these detrimental properties are exhibited, the sample is designated a failure.

The following description sets forth in complete detail several other nonbutterfat dairy products:

WHIPPED TOPPING BASES

Whipped toppings for desserts have been utilized in commercial bakeries for some time; it was not, however, until the advent of the commercial aerosol can that these toppings attained widespread home use. Sodium caseinate is conventionally utilized in the preparation of the whipped topping bases utilized in both the commercial toppings, liquid and dry as well as the aerosol can type. These toppings are another example of nonbutterfat dairy products made without sacrifice of flavor or aesthetic appearance, in a potential per capita availability greater than natural butterfat containing commodities. Within the provisions of this invention it has been found that the sodium caseinate can be replaced totally or partially on a protein basis in whipped topping bases to provide equal or superior results. Sodium caseinate is utilized to fulfill the same function here as in coffee whiteners, i.e., to bind water and encapsulate the oil or fat droplets thereby stabilizing the emulsion and stabilizing the foam eventually produced. Sodium caseinate is normally used in these compositions in an amount of from about 0.5 percent to about 10 percent by weight.

Representative formulations of both liquid and dry whipped topping bases are set forth below showing relative ranges of ingredients.

| Whipped Toppings, Liquid Ingredients | % (Range) |
| --- | --- |
| Sodium caseinate or | 0.5–5.0 |
| LAP-whey mixture | 1.5–15.0 |
| (1.3/3.0 LAP/whey) | |
| Sugar | 0–15.0 |
| Corn syrup solids | 0–15.0 |
| (Adjusted for LAP-whey mixture) | 0–10.0 |
| Vegetable shortening | 20.0–40.0 |
| Stabilizer and emulsifiers | 0.2–5.0 |
| Flavor and color | As needed |
| Water | To bring to 100% |

| Whipped Toppings, Dry Ingredients | % (Range) |
| --- | --- |
| Sodium caseinate or | 3.0–10.0 |
| LAP-whey mixture | 9.0–30.0 |
| (1.3/3.0 LAP-whey) | |
| Vegetable shortening | 50.0–70.0 |
| Sugar | 0–20.0 |
| (Adjusted for LAP-whey mixture) | 0–7.0 |
| Corn syrup solids | 0–20.0 |
| Stabilizers, emulsifiers, buffers, flavor, color | 0–15.0 |

Lactalbumin phosphate (LAP)-whey mixture can be used to replace sodium caseinate totally or in part in these formulations.

The sodium caseinate, or LAP-whey mixture is blended with the sugar and stabilizer. The water is placed in a steam jacketed kettle and the dry ingredients are added. The mixture is heated to a temperature of 120° F. The shortening and emulsifiers are melted together and added to the water suspension and the combined mixture is heated to a temperature of 160° F. with stirring. The hot solution is homogenized in a two-stage homogenizer at 1500/500 p.s.i. The homogenized mixture is cooled to a temperature of 35° to 40° F. and aged overnight at this temperature. The dry composition can be prepared from the liquid composition by conventional drying techniques such as spray drying.

FROZEN DESSERTS

Another area where nonbutterfat dairy products have received public acceptance is in the area of frozen desserts such as the mellorines and "milk type" sherbets. In these compositions sodium caseinate is normally used to bind water, encapsulate fat droplets, and stabilize air blended into the mixture. It also serves to inhibit churning. Sodium caseinate is normally used in the formulations of such frozen desserts in amounts of from about 0.1 to about 5 percent by weight total. It has been found that the sodium caseinate in such formulations can be partially or totally replaced by whey-lactalbumin phosphate mixture to give equivalent or superior results.

Set forth below is a general formulation of such frozen desserts showing the percentage range of the ingredients used.

Frozen Desserts—Mellorines, Ice Milks, etc.

| Ingredients | % (Range) |
| --- | --- |
| Sodium caseinate or | 0.5–5.0 |
| LAP-whey mixture | 1.5–15.0 |
| (1.3/3.0 LAP/whey) | |
| Sugar | 0–25.0 |
| (Adjusted for LAP-whey mixture) | 0–15.0 |
| Corn syrup solids | 0–20.0 |
| (Adjusted for LAP-whey mixture) | 0–8.0 |
| Vegetable shortening | 5.0–15.0 |
| Stabilizer and emulsifiers | 0.1–3.0 |
| Flavoring, color, salt | As needed |
| Water | To bring to 100% |

The sodium caseinate or LAP-whey mixture is blended with the sugar and stabilizer. The water is placed in a steam jacketed kettle and the dry ingredients are added with stirring. While stirring the corn syrup solids are added and stirred followed by the addition of the shortening, emulsifier and salt. The mixture is heated in the kettle to a temperature of 160° F. The hot solution is homogenized in a two-stage homogenizer at 2500/500 p.s.i. The homogenized liquid is cooled to a temperature of 35° to 40° F. and was aged overnight at this temperature. The aged solution is frozen in a conventional commercial ice cream freezer at 20-25° F. and then permitted to harden at a temperature of about −10° F. for a period of 12 hours.

IMITATION SOUR CREAM

A general formulation for imitation sour cream is as follows:

| Imitation Sour Creams Ingredients | % (Range) |
| --- | --- |
| Sodium caseinate or | 0.5–5.0 |
| LAP-whey mixture | 1.5–15.0 |
| (1.3/3.0 LAP/whey) | |
| Vegetable shortening | 10.0–25.0 |
| Sugar and/or corn syrup solids | 5.0–15.0 |
| (Adjusted for LAP-whey mixture) | 3.0–10.0 |
| Stabilizers and emulsifiers | 0.1–2.0 |
| Flavor and color | As needed |
| Water | To bring to 100% |

This formulation is prepared by the following procedure:

Procedure

Heat water to 90°–110° F.

Add sodium caseinate or LAP-whey mixture and stabilizer. Mix to dissolve.

Add shortening and emulsifier.

Pasteurize with stirring at 165° F. for 30 minutes.

Homogenize twice at 2500 p.s.i. (one stage only), keeping temperature above 160° F. during the two homogenization steps.

Cool mix to 72° F. and add the culture to be used 3% buttermilk or a commercial starter, following manufacturer's directions).

Maintain at 72° F. for ripening until acidity reaches 0.8% (18–20 hours). Cool to 35°–40° F.

IMITATION CREAM CHEESE

Sodium caseinate is an effective ingredient in the formulation of imitation cream cheese. Whey-polyphosphate mixture is an effective replacement for the sodium caseinate in whole or part.

A typical general and specific formulation for imitation cream cheese is set forth below:

| Imitation Cream Cheese Ingredients | % (Range) |
|---|---|
| Sodium caseinate or | 0.5–5.0 |
| LAP-whey mixture | 1.5–15.0 |
| (1.3/3.0 LAP-whey) | |
| Sugar or corn syrup solids | 5.0–15.0 |
| (Adjusted for LAP-whey mixture) | 3.0–10.0 |
| Vegetable shortening | 15.0–40.0 |
| Stabilizer and emulsifiers | 0.1–5.0 |
| Flavorings, color | As needed |
| Water | To bring to 100% |

| Imitation Cream Cheese Ingredients | % (Range) |
|---|---|
| LAP-whey mixture | 4.30 |
| (1.3/3.0 LAP/whey) | |
| Corn syrup solids | 4.70 |
| Salt | 0.15 |
| Stabilizer and emulsifier | 2.55 |
| Vegetable shortening | 25.00 |
| Flavored acid | 0.85 |
| Water | 62.45 |

LAP-whey mixture can similarly effectively replace sodium caseinate in baby formulas, cream pie bases, cocoa drinks, "Instant Breakfasts," and process cheese as well as in nutrient application for soup and baby foods.

The vegetable shortening used in the formulations above and throughout the specification are hydrogenated vegetable oils. Such shortening materials are made from many oils, some being mixtures of such oils. All of which are well known in the art. Exemplary of such oils are soy bean oil, corn oil, coconut oil, peanut oil, safflower seed oil and the like. It is, of course, understood that animal fats such as those which are conventionally used as shortenings such as for example, lard, can be used herein.

Emulsifying agents used in the formulations of this invention are preferably the mono and diglycerides of the fat acids usually in admixture. However, any other food grade emulsifiers can be used.

Similarly, stabilizers other than carageenin such as tragacanth, guar, carboxymethyl cellulose and the like can be used as stabilizers.

Corn syrup solids can be replaced with any other dextrose material which provides equivalent results.

Natural and artificial sweeteners such as honey, and the cyclamates can be used in place of sugar where desired.

Similarly dipotassium phosphate is set forth herein as a buffer material. Other equivalent food grade buffer materials can be used, such as sodium phosphate and the like.

In any of the compositions of this invention such flavorings as are normally used in the art can be similarly used herein.

Clearly, many variations and modifications are within the scope and spirit of this invention and therefore no unnecessary limitations should be implied from the foregoing specification.

What is claimed is:

1. A food additive composition consisting essentially of dry particulate mixture of dry whey solids and from one percent to about 40 percent by weight based on the percent whey protein of lactalbumin phosphate.

2. The composition of claim 1, wherein the lactalbumin phosphate is present in an amount of from about 10 to about 40 percent by weight.

3. The composition of claim 1, wherein the lactalbumin phosphate is present in an amount of from about 25 to about 35 percent by weight.

4. The composition of claim 1, wherein the dry whey solids have a mineral content of from about one to about 5 percent.

5. The composition of claim 1, wherein dry whey solids have a mineral content of from about 2 to about 4 percent.

6. A food composition containing from about 0.05 to about 15 percent by weight of the composition of claim 1.

7. A nonbutterfat dairy composition containing from about 0.05 to about 15 percent by weight of the composition of claim 5.

8. The composition of claim 7, wherein the nonbutterfat dairy composition is a coffee whitener.

9. A nonbutterfat dairy composition normally containing sodium caseinate selected from the group consisting of coffee whiteners, whipped toppings, mellorine, frozen desserts, puddings, custards, frozen cream pies, process cheese, imitation sour creams, snack dips, baby foods and instant breakfasts where from about 1 percent to 100 percent by weight protein basis of the sodium caseinate requirement has been replaced by the composition of claim 1.

10. The composition of claim 9, wherein the nonbutterfat dairy product is a coffee whitener.

11. A method for preparing a food composition normally containing sodium caseinate which comprises replacing at least a part of the sodium caseinate requirement of said food composition with a dry particulate mixture of dry whey solids and from 1 percent to about 40 percent by weight based on the percent whey protein of lactalbumin phosphate.

12. The method as recited in claim 11 wherein said lactalbumin phosphate is present in an amount of from about 25 percent to about 35 percent by weight.

13. The method as recited in claim 11 wherein said dry whey solids have a mineral content of from about 2 to about 4 percent.

14. A method as recited in claim 11 wherein said food composition is a coffee whitener.

15. A method as recited in claim 11 wherein said dry particulate mixture is added to said food composition in an amount sufficient to provide a food composition containing from about 0.05 to about 15 percent by weight of said dry particulate mixture.

* * * * *